United States Patent [19]

Owoc

[11] 4,452,426
[45] Jun. 5, 1984

[54] BENT BELLOWS SEALED ROTARY VALVE

[75] Inventor: James R. Owoc, Pittsburgh, Pa.

[73] Assignee: Kerotest Manufacturing Corp., Pittsburgh, Pa.

[21] Appl. No.: 357,258

[22] Filed: Mar. 11, 1982

[51] Int. Cl.³ ............................................. F16K 41/10
[52] U.S. Cl. ................................. 251/335 B; 251/214
[58] Field of Search ............... 251/335 B, 335 R, 315, 251/214

[56] References Cited

U.S. PATENT DOCUMENTS

| | | | |
|---|---|---|---|
| 1,301,948 | 4/1919 | Kaplan et al. | 251/335 B |
| 1,514,968 | 11/1924 | Hull | 251/335 B |
| 2,659,569 | 11/1953 | Ehlke | 251/335 B |
| 3,782,685 | 1/1974 | Gallagher et al. | 251/335 B |
| 3,811,651 | 5/1974 | Gallagher et al. | 251/335 B |

FOREIGN PATENT DOCUMENTS

| | | |
|---|---|---|
| 350865 | 6/1979 | Austria . |
| 356470 | 4/1980 | Austria . |
| 785149 | 10/1957 | United Kingdom . |

OTHER PUBLICATIONS

*Manually Operated Bellows Valves* Nupro Company, Willoughby, Ohio, 1973.

*Primary Examiner*—A. Michael Chambers
*Attorney, Agent, or Firm*—Staley J. Price, Jr.; John M. Adams

[57] ABSTRACT

A valve body includes a passageway for the flow of fluid therethrough. A valve member, such as a ball valve member, is positioned in the passageway for rotatable movement about a first rotational axis between an open position and a closed position to open and close the passageway. An actuator orbits about the first axis to move the valve member between the open and closed positions. A bent unitary valve stem extends between the valve member and the actuator. A lower end of the unitary valve stem is aligned with the first axis and is connected to the valve member for rotation with the valve member. An upper end of the unitary valve stem is aligned with a second axis angularly displaced from the first axis. A bearing assembly retained in the actuator connects the stem upper end to the actuator. A bellows bent to follow the curvature of the valve stem surrounds the valve stem to form a primary pressure boundary hermetically sealing the valve stem. A housing surrounds the bellows forming a secondary pressure boundary with the handle and accompanying static and dynamic O-ring seals. A lower end of the bellows is connected to the valve body. An upper end of the bellows is connected to the bearing assembly which rotatably supports the bellows in the actuator. The actuator orbits about the first axis to open and close the valve; while the upper end of the bellows rotates about the second axis. Turning the actuator transmits torque through the pressure boundaries without applying torque to the bellows.

11 Claims, 3 Drawing Figures

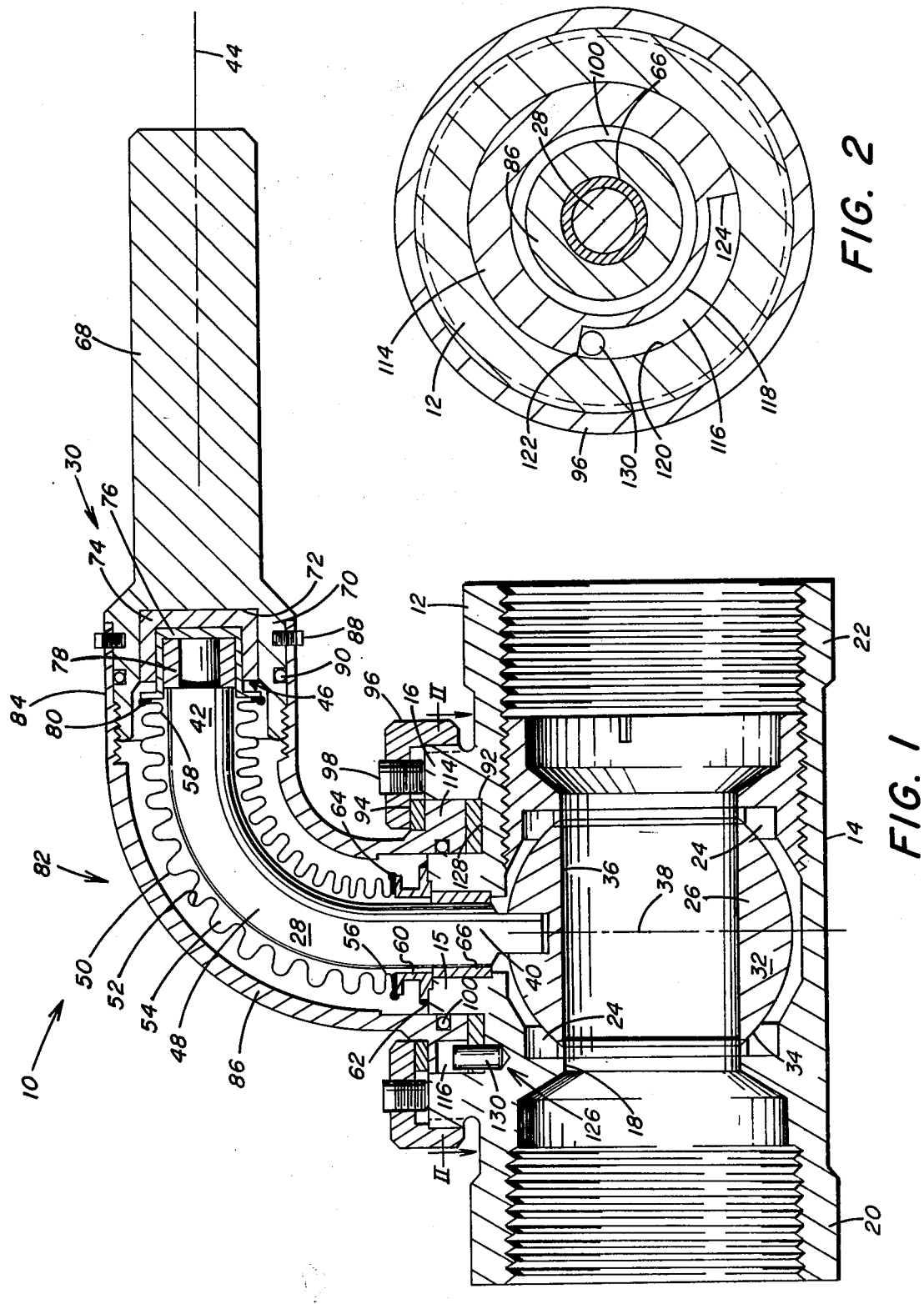

BENT BELLOWS SEALED ROTARY VALVE

BACKGROUND OF THE INVENTION

1. Field of the Invention

This invention relates to a valve and more particularly to a rotary valve having a bent valve stem sealed by a bellows which is rotatably connected to an actuator to permit transmission of torque from the actuator to the valve stem through a pressure boundary formed by the bellows without applying torque to the bellows.

2. Description of the Prior Art

In rotary valves, such as butterfly, ball, plug, and the like, for the conveyance of fluids and particularly contaminated fluids at high pressure, as well as, at substantially reduced pressure or under vacuum conditions, it is preferred to utilize static seals as opposed to packed or dynamic seals. Packed and dynamic seals are subject to wear and result in valve leakage, particularly at the pressure boundary between the valve stem and the valve member. A commonly used static seal is a bellows surrounding the valve stem. U.S. Pat. Nos. 1,644,825; 2,659,569; 2,659,570; and 3,811,651 disclose valves that utilize a bellows for sealing around the valve stem between the valve actuator and the valve member.

Conventionally, a bellows when used to seal a valve stem is bonded or welded to the structure of the valve body that supports the rotatable valve member at one end and at the opposite end to a retainer or cap that connects the valve stem to the valve actuator. Because the connections at the ends of the bellows are metal-to-metal, a static seal is formed. It is well known that static seals are not satisfactory for transmitting rotation. Therefore, a bellows, used heretobefore as a static seal is not adaptable for transmission of torque from the valve actuator to the valve stem. It is also known to laterally deflect the valve stem or utilize a crank-like valve stem and hermetically seal the stem. In this manner, the valve stem connects the actuator to the valve member to prevent torsional loading of the bellows, as illustrated in U.S. Pat. Nos. 1,644,825 and 3,811,651.

While it has been suggested by the prior art devices to utilize a bellows as a static seal, particularly in valve applications where contaminated fluids are to be contained, the prior art devices do not permit the transmission of torque through the pressure boundary provided by the bellows. Therefore, there is a need in non-rising rotary valves for a valve stem sealed by a bellows that is supported at its end portions in a manner to permit transmission of torque through the bellows seal without applying torque to the bellows.

SUMMARY OF THE INVENTION

In accordance with the present invention, there is provided a valve that includes a valve body and a passageway extending through the valve body for the flow of fluid therethrough. A valve member is positioned in the passageway for rotatable movement about a first axis between an open position and a closed position to open and close the passageway. Actuating means rotatable about the first axis moves the valve between an open position and a closed position. A unitary valve stem extends between the valve member and the actuating means. A unitary valve stem has a lower end portion aligned with the first axis and is connected to the valve member for rotation with the valve member about the first axis. The unitary valve stem has an upper end portion aligned with a second axis angularly displaced from the first axis and is connected to the actuating means. The actuating means is orbited about the first axis to move the valve member between the open and closed positions. A bearing assembly retained in the actuating means supports the unitary valve stem upper end portion. A bellows surrounds the unitary valve stem. The bellows has a lower end portion and an upper end portion. Means is provided for connecting the bellows lower end portion to the valve body to provide a seal around the valve stem lower end portion at the valve body. The bellows upper end portion is connected to the bearing assembly to permit rotation of the bellows upper end portion relative to the actuating means and stem upper end portion and provide a seal around the valve stem.

In one embodiment, the valve stem is bent at a 90° angle and the resulting curvature of the bellows corresponds to the curvature of the valve stem so that the valve stem supports the bellows to prevent distortion of the bellows, particularly during high pressure operations. The bellows, in turn, is enclosed by a stem housing having a curvature corresponding to the curvature of the stem. In operation, the bellows is internally pressurized. distortion of the bellows under high pressure is prevented by contact of the bellows with the stem substantially along the entire length of the bellows. This arrangement permits the bellows to be subjected to increased pressure without failing.

The bellows lower end portion is welded to a bellows plate which surrounds the valve stem lower end portion and is, in turn, welded to the valve body. The upper end portion of the bellows is welded to a bellows cap supported by the bearing assembly. The bellows cap is positioned in surrounding relation with the valve stem upper end portion and within a recess of the actuating means. A first bearing member retained in the actuating means supports the cap to permit relative rotation between the actuating means and the bellows cap. A second bearing member is retained in the bellows cap and is positioned on the stem upper end portion to permit the bellows cap to rotate relative to the stem upper end portion. The bellows upper end portion is welded to the bellows cap.

The upper end portions of the bellows and the valve stem are aligned with the actuating means on the second axis so that upon orbital movement of the actuating means about the first axis torque is transmitted through the bellows seal to the valve stem. This arrangement also permits differential rotation of the bellows upper end relative to the actuating means about the second axis. The bellows is connected in a sealed manner, as by welding, to the bellows cap to provide a hermetic seal around the valve stem. Thus, the bearing assembly permits differential rotation between the actuating means and the bellows upper end portion.

Preferably, the actuating means is in the form of an elongated handle horizontally positioned to swing or orbit about the first axis to open and close the valve. Orbiting the handle transmits a lateral force through the bearing assembly and the bellows cap to the valve stem upper end portion. This force generates rotation of the valve stem lower end portion about the first axis.

A rotatable housing surrounds the bellows. The upper portion of the housing and the elongated handle are sealingly engaged, preferably by a static O-ring seal. The lower portion of the housing and the valve body are sealingly engaged, preferably by a dynamic O-ring seal. The housing, handle, and accompanying seals serve as a secondary pressure boundary to back up the primary pressure boundary formed by the welded connection of the bellows to the bellows cap and body in the event of bellows failure. The back up or secondary pressure boundary is operable to contain the full line pressure.

In one embodiment, the first rotational axis is oriented at 90° relative to the second rotational axis, thereby forming a 90° bend of the valve stem and bellows. In a second embodiment, the first rotational axis is vertically positioned and the second rotational axis and valve stem upper end portion are inclined at 45° relative to the first axis with the actuator maintaining a horizontal position. Bending the valve stem at a 90° angle provides for a compact valve configuration with a reduced actuator height where the actuator is substantially removed from the rotational axis of the valve member.

Accordingly, the principal object of the present invention is to provide a rotary valve that includes a bellows for hermetically sealing a valve stem between a valve actuator and a valve member where the bellows is rotatably supported relative to the actuator to permit application of torque through the bellows to the stem without applying torque to the bellows.

A further object of the present invention is to provide in a rotary valve, a valve actuator that is connected by a bearing assembly to a bellows which hermetically seals a valve stem to provide a packless pressure boundary at the connection between the valve stem and the actuator and through which torque is applied to the valve stem.

Another object of the present invention is to provide a rotary valve including a bellows seal for a valve stem where the bellows is connected to an actuator that rotatably supports the upper end of the bellows and functions as a back up seal for the bellows in the event of bellows failure.

An additional object of the present invention is to provide a compact rotary valve having a bent valve stem surrounded and sealed by a bellows which is supported against distortion when pressurized by contact of the bellows with the valve stem thereby permitting the bellows to be subjected to higher pressures without failing.

These and other objects of the present invention will be more completely disclosed and described in the following specification, the accompanying drawings and the appended claims.

BRIEF DESCRIPTION OF THE DRAWINGS

FIG. 1 is a sectional view, in side elevation, of a ball valve illustrating a bent valve stem hermetically sealed by a bellows rotatably supported by a valve actuator.

FIG. 2 is a sectional view taken along the line II—II of FIG. 1.

DESCRIPTION OF THE PREFERRED EMBODIMENTS

Figure 3:
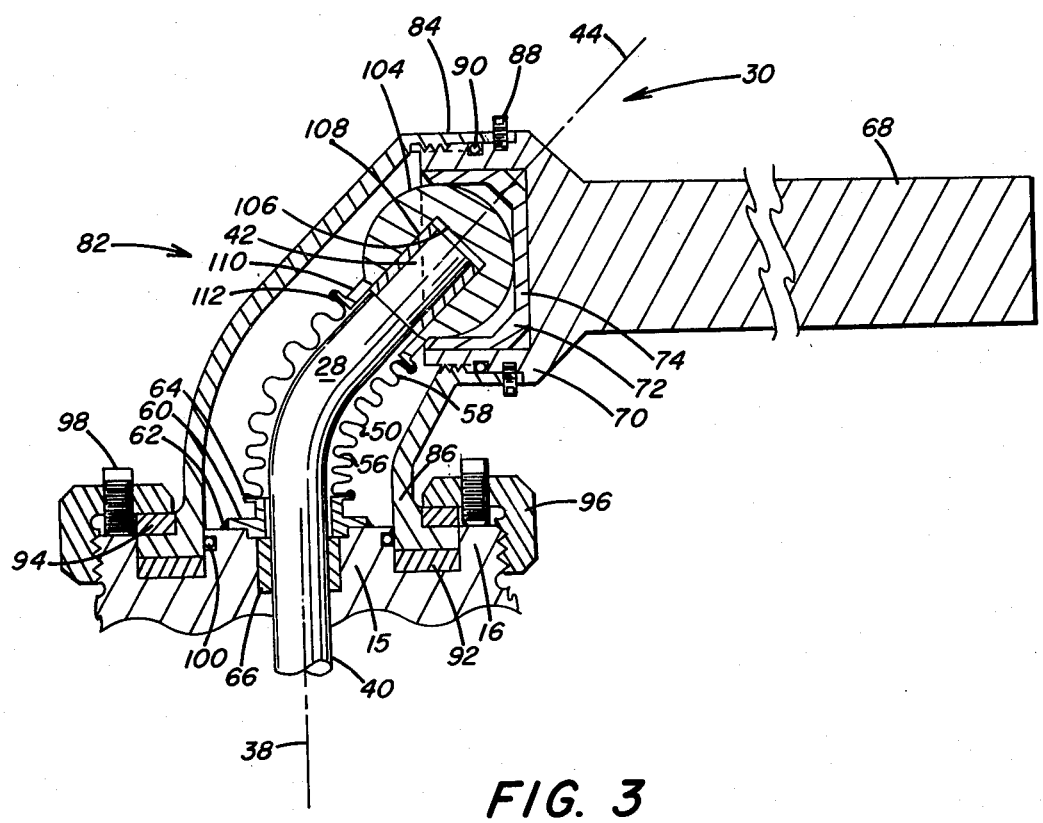
FIG. 3 is a fragmentary view, in side elevation, of another embodiment for the curvature of the valve stem and bellows, illustrating a universal type connection of the valve stem to the actuator.

Referring to the drawings, and particularly to FIGS. 1 and 2, there is illustrated a valve assembly generally designated by the numeral 10 of the ball type for controlling the flow of fluid, either a liquid or a gas through a piping system. The valve assembly 10 includes a valve body generally designated by the numeral 12 having a conduit portion 14 and an upwardly extending annular portion 16 formed integral with the conduit portion 14. The valve body 12 is fabricated of a preselected rigid material. A passageway 18 extends through the conduit portion 14. The passageway 18 includes opposite end portions 20 and 22 that are adaptable for connection to service conduits by any suitable means, such as threading the service conduits into the end portions 20 and 22. In this manner, the valve assembly 10 is operble to control the fluid from one conduit connected to end portion 20 to another conduit connected to end portion 22.

The valve assembly 10 also includes a valve seat generally designated by the numeral 24. A rotatably mounted valve member 26 is connected to a valve stem 28 that is rotated by a valve actuator generally designated by the numeral 30. The valve member 26 illustrated in FIG. 1 is characteristic of the valve member utilized in ball type valves; however, other rotary types may be used, such as a butterfly, plug and the like. The valve member 26 includes a body portion 32 having an arcuate surface 34. The arcuate surface 34 remains in contact with the valve seat 24 as the valve body portion 32 is rotated in the passageway 18. The body portion 32 has a through bore 36 movable into and out of alignment with the passageway 18 to permit flow of fluid from end portion 20 through the passageway 18 to the end portion 22 when the valve member 26 is moved to the open position, as illustrated in FIG. 1. Rotation of the valve stem 28 through 90° moves the through bore 36 out of alignment with the passageway 18. The passageway 18 is then obstructed by the solid arcuate surface 34 of the valve member 26 to block flow through passageway 18.

Movement of the valve member 26 between the open position as illustrated in FIG. 1 and the closed position (not shown) is controlled by orbiting the valve actuator 30 about an axis 38 which is coaxially aligned with a lower end portion 40 of the valve stem 28. The valve stem lower end portion 40 is nonrotatably connected to the valve member body 32. The valve stem 28 includes an upper end portion 42 that is axially aligned with a second axis 44. The valve stem upper end portion 42 is connected to the actuator 30 so that 90° movement of the actuator 30 about the axis 38 moves the valve member 26 between the open and closed positions.

The valve stem upper end portion 42 is connected to the actuator 30 by a bearing assembly generally designated by the numeral 46. The valve stem upper end portion 42 extends along an arcuate path to the lower end portion 40. The valve stem 28 is a unitary member having a bent or curved central body portion 48, with the upper end portion 42 aligned with the axis 44 and the lower end portion 40 aligned with the axis 38. As illustrated in FIG. 1, the axis 44 is positioned in a horizontal plane, and the axis 38 is positioned in a vertical plane.

A bellows 50 surrounds the valve stem 28 between the upper and lower end portions 42 and 40. The bellows 50 has a generally cylindrical body portion 52 unitary in length and comprising a circumferentially corrugated, axially extending, relatively thin cylindrical wall. Preferably the bellows 50 is metallic, impermeable, flexible and torsionally rigid. The bellows 50 has a passageway 54 extending between a lower open end portion 56 and an upper open end portion 58. The bellows 50 has an inner diameter positioned closely adjacent the outer diameter of the valve stem 28. With this arrangement, the valve stem 28 supports the bellows 50 to prevent distortion and structural weakening of the bellows 50 when subjected to internal or external fluid pressure.

The bellows upper end portion 58 is connected to the actuator 30 to permit relative rotation between the actuator 30 and the bellows upper end portion 58. The bellows upper end portion 58 is axially aligned with the valve stem upper end portion 42 and the actuator 30 on axis 44. The bellows lower end portion 56 is axially aligned with the valve stem lower end portion on axis 38. The bellows lower end portion 56 is connected to the valve body conduit portion 14.

As illustrated in FIG. 1, a bellows plate 60 is welded at 62 to an annular body portion 15 positioned within the annular body portion 16 and surrounding the valve stem lower end portion 40. The valve stem 28 extends upwardly through the bellows plate 60. The bellows lower end portion 56 is welded at 64 to the upper flanged surface of the bellows plate 60 to connect the bellows 50 to the valve body 12. It should be understood that other means may be utilized to connect the bellows 50 to the valve body 12, such as by a bolted connection. A journal-type bearing or bushing 66 is positioned below the bellows plate 60 and is supported by the valve body annular portion 15 in surrounding relation with the valve stem lower end portion 40. The bearing 66 rotatably supports the valve member lower end portion 40 in the valve body 12. Any suitable low friction bearing may be used to rotatably support the valve stem lower end portion 40, such as roller, ball, needle and the like.

As illustrated in FIG. 1, the actuator 30 includes a handle 68 having a longitudinal axis positioned on the horizontal axis 44 and is connected to the valve stem upper end portion 41 by the bearing assembly 46. The handle 68 includes a socketed end portion 70 having a recess 72 for receiving the bearing assembly 46. The bearing assembly 46 includes a handle bearing portion 74 which is preferably a journal-type bearing operable to carry both radial and thrust loads. The handle bearing 74 is positioned in the recess 72. The handle bearing 74 surrounds and receives a bellows cap 76. The handle bearing 74 supports the bellows cap 76 for rotation relative to the handle 68. The bellows cap 76, in turn, includes a recess for receiving a stem bearing 78 which also is preferably a journal-type bearing operable to carry radial loads. The stem bearing 78 is positioned in surrounding relation with the valve stem upper end portion 42 and permits the bellows cap 76 to rotate relative to the valve stem upper end portion 42.

The bellows cap 76 is closed at one end portion to surround the valve stem upper end portion 42 within the socketed end portion 70 of the handle 68. The bellows cap 76 includes an opposite flanged open end portion positioned opposite the bellows upper end portion 58. The bellows upper end portion 58 is welded at 80 to the flanged end of the bellows cap 76. Thus, with this arrangement, relative rotation is permitted by means of bearing 74 between the handle 68 and the bellows cap 76 welded to the bellows upper end portion 58. Further, relative rotation is permitted by means of bearing 78 between the bellows cap 76 and the valve stem upper end portion 42. By the combination of the thrust and radial bearings 74 and 78, lateral force is transmitted from the handle 68 to the valve stem 28 as the handle 68 is orbited or turned about the stationary vertical axis 38 of the valve stem 28 to apply torque to the valve stem lower end portion 40.

Further, in accordance with the present invention, the welded connection of the bellows upper end portion 58 to the flanged end of the bellows cap 76, together with the welded connection of the bellows lower end portion 56 to the bellows plate 60 which is welded to the annular body portion 15, hermetically seals the valve stem 28. These welded connections provide impermeable joining of the bellows 52, bellows cap 76, bellows plate 60, and body 15 to form the valve primary pressure boundary.

A rotatable housing generally designated by the numeral 82 surrounds and encloses the bellows 50. The housing 82 includes an upper end portion 84 nonrotatably connected to the socketed end portion 70 of the handle 68 and a lower end portion 86 rotatably supported on the valve body annular portions 15 and 16. Preferably, the housing 82 has a curved configuration corresponding to the curved configuration of the valve stem 28 and the bellows 50. The housing upper end portion 84 is nonrotatably connected to the handle socketed end portion 70 in any suitable manner. As illustrated in FIG. 1, the upper end 84 is internally threaded to receive in threaded engagement the externally threaded handle end portion 70. Set screws 88 extend through the housing end portion 84 and into the handle end portion 70 to lock the housing end portion 84 to the handle 68. Further, a static O-ring seal 90 is provided between the handle socketed end portion 70 and the housing end portion 84.

At the lower end portion 86 of the housing 82 a housing bearing 92 rotatably supports the lower end portion 86. In addition, a housing bearing 94 surrounds the lower end portion 86. In this manner, the housing lower end portion 86 is rotatably supported on the valve body annular portions 15 and 16. A bearing cap 96 is threadedly engaged to the annular portion 16 and is positioned in overlying relation with the housing bearing 94 to retain the bearing 94 in position around the housing lower end portion 86. The bearing cap 96 is also locked in place on the annular portion 16 by set screws 98. Further, a dynamic seal is provided around the annular portion 15 by an O-ring retained within a recess of housing flange 114 sealingly engaging the outer surface of the annular portion 15.

In the event the bellows 50 fails to contain the fluid pressure within the valve assembly 10, the housing 82 and the handle 68 are operable to contain the line pressure and prevent leakage from the valve assembly 10. In this regard, both the housing 82 and the handle 68 are operable as a secondary seal means to back up the primary seal means provided by the bellows 50. In the event the seal provided by the bellows 50 around the valve stem upper end portion 42 fails, the pressure and line fluid is contained by the handle 68, housing 82 and the O-rings. In this regard, the handle 68 not only functions as a means for actuating the valve 10 but is also operable as part of a back up pressure boundary to the primary pressure boundary provided by the bellows 50.

The O-ring 100 is operable as a dynamic seal to prevent leakage between the valve body annular potion 15 and the stem housing lower end portion 86. The O-ring 90 is operable as a static seal to prevent leakage between the housing upper end portion 84 and the handle 68.

To operate the valve assembly 10, the handle 68 is orbited around the axis 38. As seen in FIG. 1, the axis 38 is at an angle of 90° relative to the axis 44 thereby forming a 90° bend of the valve stem 28 and the bellows 50. The angle of curvature of the stem 28 is not limited to 90°. As illustrated in FIG. 3, the axis of the valve stem upper end portion 42 is displaced at an angle of 45° from the axis of the valve stem lower end portion 40. This arrangement will be described hereinafter in greater detail with reference to FIG. 3. As the handle 68 is turned in a 90° orbit around the axis 38 to either open or close the passageway 18, axis 44 rotates with the handle 68 within a horizontal plane about axis 38 and the bearing assembly 46 and particularly the bellows cap 76 is carried with the handle 68 and the axis 44. The bellows upper end portion 58 and the bellows cap 76 rotate about the axis 44. Therefore, relative rotation is permitted between the handle 68 and the bellows cap 76 and the horizontal stem upper end portion 42 and the bellows cap 76. The bellows cap 76 rotates about axis 44 relative to both the stem upper end portion 42 and the handle 68. This arrangement permits the bellows 50 to flex while remaining torsionally rigid as the handle 68 is turned. Turning the handle 68 results in rotation of the bellows cap 76 and bellows upper end portion 58 and rotational movement of the valve member 26 about axis 38.

The housing 82 is connected to the handle 68 and also rotates about the axis 38. Due to the torsional rigidity of the bellows 50, the bellows upper end portion 58 is operable to rotate with the bellows cap 76 about the axis 44. By permitting relative rotation between the bellows cap 76 and the handle 68 about axis 44 torque is transmitted to the valve member 26 from outside the pressure boundary through the metal seal provided by the bellows 50 at the connection of the handle 68 to the valve stem upper end portion 42.

In operation of the ball valve 10, the bellows 50 is subject to internal pressure as the handle 68 is turned. With the bellows 50 internally pressurized, the bellows will be forced upwardly as the pressure increases. The bellows 50 will tend to rub against the outer surface of the valve stem 28. With the bellows 50 being bent, as illustrated in FIG. 1, and internally pressurized the bellows tend to rub against the outer surface of the valve stem 28. With the bellows 50 being bent, as illustrated in FIG. 1, and internally pressurized the bellows tends to be unstable and, therefore, subject to distortion. This has the effect of reducing the bellows' life and eventually rendering the bellows inoperable to contain the full line pressure.

To enhance the stability of the initially flexed bellows 50, the valve stem 28 supports the bellows 50 to restrain uncontrolled buckling or squirm of the bellows. Preferably, the spacing between the outer surface of the valve stem 28 and the inner surface of the bellows 50 allows for distribution of surface contact between the bellows and the valve stem over substantially the entire bent length of the valve stem 28.

By increasing the area of contact between the bellows 50 and the valve stem 28, the overall stability of the bellows 50 is increased and localized distortion or buckling of the bellows 50 at concentrated points is eliminated. With the present invention, a substantial number of convolutions of the bellows 50 are in contact with the valve stem 28 and thus uncontrolled buckling is minimized and bellows failure attributed to uncontrolled buckling is prevented. To prevent wear of the bellows 50 by contact with the valve stem 28 the stem 28 may be provided with a low friction stem coating or surface.

Now referring to FIG. 3, in which like numerals designate like parts of FIG. 1, there is illustrated another embodiment of the valve stem 28 and the rotatable connection between the actuator 30 and the valve stem 28. As above discussed with reference to FIG. 1, the valve stem 28 is bent at a 90° angle. In FIG. 3, a 45° bend of the valve stem is illustrated. With a 90° valve stem, the lateral force applied to the stem upper end portion 42 is transmitted through the bellows connection at a point substantially displaced from the rotational axis 38 providing a greater mechanical advantage in turning the valve stem 28. However, with a 45° or less than 90° valve stem configuration, the bending of the bellows 50 is reduced from that of a 90° valve stem configuration. Also, the actuator 30 is retained in a more confined area and the length of the bellows is reduced with the 45° valve stem configuration.

As illustrated in FIG. 3, the handle 68 is also rotatably connected to the valve stem upper end portion 42 to permit the transmission of torque through the bellows seal to the valve stem without applying torsion to the bellows. The rotatable handle 68 and housing 82 with accompanying O-ring seals 90 and 100 also function as a secondary or backup pressure boundary to the primary pressure boundary provided by the welded connections of bellows upper end portion 58 to the bellows cap 104 and the bellows lower end portion 56 to the bellows plate 60 as hereinabove described for FIG. 1. The handle socketed end portion 70 retains the handle bearing 74.

A spherical bellows cap 104 is positioned in the handle bearing 74. The spherical bellows cap 104 includes a cylindrical counterbore 106 and a bushing 108 is received in the counterbore 106. The stem upper end portion 42 extends into the bushing 108 to thereby connect the stem to the bellows cap 104. Thus, with this arrangement, the stem to bellows cap to handle connection illustrated in FIG. 3 forms a universal-type joint. The axis 44 passes through the stem upper end portion 42 and the spherical bellows cap 104 rotates about the axis 44. The centerline of the handle 68 is also offset from the axis 44 in this embodiment.

The bellows cap 104 includes a shoulder portion 110. The bellows open upper end portion 58 is seal welded at 112 to the shoulder portion 110. In this manner the valve stem 28 is sealed within the bellows 50. As above described with reference to FIG. 1, the bellows 50 is seal welded at its lower end portion 56 to the bellows plate 60 which is, in turn, welded to the valve body annular portion 15. The housing 82 surrounds the bellows 50 and is suitably connected at the upper end portion 84 to the handle 68 and at the lower end portion 86 to the valve body 12.

With this arrangement, the handle 68, the housing 82, the valve stem 28, the bearing assembly 46, and the bellows 50 rotate as a unit about the vertical axis 38. Thus, the bellows 50 is connected to the stem upper end portion 42 in a manner to permit torque to be transmitted from the handle 68 to the stem 28 without applying torque to the bellows 50. The sealed connections of the bellows upper end portion 58 to the bellows cap 104, the bellows lower end portion 56 to the bellows plate 60, and the bellows plate 60 to the valve body annular portion 15 form the primary pressure boundary around the valve stem 28. The nonrotatable connection of the housing to the handle, which is rotatable about the axis 38, along with the accompanying static O-ring seal 90 and the dynamic O-ring seal 100 form the secondary pressure boundary. As above described, if the primary pressure boundary fails, then the secondary pressure boundary is operable to contain the full line pressure.

Now referring to FIG. 2, there is illustrated an arrangement for limiting rotation of the actuator housing 82 to 90°. The housing lower end portion 86 includes a flange 114. A channel 116 is machined in the bottom surface of the flange 114 and extends around the flange 114 for only an arcuate portion of the flange 114. For example, as illustrated in FIG. 2, the channel 116 extends through a quadrant of the flange 114. Thus, as illustrated in FIG. 2, the channel 116 is formed by an arcuate surface 118 on the housing flange 114 and an opposite arcuate surface 120 formed on the valve body annular portion 16. The channel 116 has closed end portions 122 and 124. An actuator housing stop generally designated by the numeral 126 is positioned within the channel 116 and is connected to the housing bearing 92 that rotatably supports the stem housing lower end portion 86. The housing bearing 92 is stationarily positioned in an annular recess 128 formed in the valve body 12 surrounding the annular portion 16. Bearing 92 shown in FIG. 1 is a bushing type bearing but other bearing arrangements can be used, such as roller bearings.

Preferably, a pin 130 extends through the housing bearing 92 into the valve body conduit portion 14. Thus the pin 130 is stationarily positioned in the channel 116. The position of the pin 130 in the channel 116 is illustrated in FIG. 2, which is a position abutting the channel closed end portion 122. However, the pin 130 may be located at a selected position within the channel 116 to limit the arcuate movement of the stem housing 82 and accordingly, the stem 28. Further as illustrated in FIG. 2, the pin 130 is positioned so as to permit 90° rotation of the valve member 26 between the open and closed positions of the valve member 26. Thus, when the handle 68 is turned from the position illustrated in FIG. 1, to a closed position, the stem housing 82 rotates with the handle 68 until the channel closed end portion 124 is moved into abutting position with the pin 130. In this position, the stem housing 82 and the stem 28 are restrained from further rotational movement about the axis 38. Even though the above arrangement describes a valve of the quarter turn type, elimination of the pin 130 permits 360° rotational capability and for this reason the present invention is adaptable on any non-rising stem valve, pump or the like. Therefore, the above described housing stop 126 may be structured to provide selected degrees of rotation of the actuator housing 82 or the pin 130 can be removed for unrestrained rotation beyond 90°.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:
1. A valve comprising,
a valve body,
a passageway extending through said valve body for the flow of fluid therethrough,
a valve member positioned in said passageway for rotatable movement about a first axis between an open position and a closed position to open and close said passageway,
actuating means rotatable in an orbital path about said first axis for moving said valve member between an open position and a closed position,
a unitary valve stem extending between said valve member and said actuating means,
said unitary valve stem having a lower end portion aligned with said first axis and connected to said valve member for rotation with said valve member about said first axis,
said unitary valve stem having an upper end portion aligned with a second axis and connected to said actuating means,
a bearing assembly retained in said actuating means for supporting said unitary valve stem upper end portion,
an internally pressurized bellows surrounding said unitary valve stem, said bellows having a lower end portion and an upper end portion,
a primary pressure boundary formed by said bellows around said valve stem to prevent the escape of fluid from said passageway through said bellows,
said primary pressure boundary at said bellows lower end portion including a bellows plate surrounding said valve stem lower end portion and sealingly connected to said valve body, said bellows lower end portion being welded to said bellows plate to form a hermetic seal around said valve stem lower end portion,
said primary pressure boundary at said bellows upper end portion including a bellows cap received within said actuating means and surrounding said valve stem upper end portion to permit rotation of said valve stem upper end portion relative to said bellows cap, said bellows upper end portion being welded to said bellows cap to form a hermetic seal around valve stem upper end portion,
a secondary pressure boundary surrounding said bellows to back-up said primary pressure boundary and prevent the escape of any fluid from said primary pressure boundary to the surrounding atmosphere,
said secondary pressure boundary including said actuating means and a rotatable housing connected in surrounding relation with said bellows at an upper end to said actuating means and at a lower end to said body,
said housing having a configuration corresponding to the configuration of said bellows and said valve stem,
said housing upper end being sealingly connected to said actuating means to rotate with said actuating means as said valve is opened and closed, and
said housing lower end being rotatably positioned on and sealingly connected to said valve body to permit said housing to rotate about said first axis as said valve member mover between said open and closed position.
2. A valve as set forth in claim 1 in which,
said housing having a second axis aligned with said actuating means axis and a first axis aligned with said valve member axis, and
said housing having an angular body portion positioned closely adjacent to and spaced from said bellows.
3. A valve as set forth in claim 1 which includes, bearing means for rotatably supporting said unitary valve stem lower portion in said valve body, and means for sealingly engaging said bellows plate to said belows lower end portion and to said valve body to form the lower portion of said primary pressure boundary between said bellows and said valve body around said valve stem lower end portion.

4. A valve as set forth in claim 1 which includes, said bellows cap positioned in surrounding relation with said unitary valve stem upper end portion between said actuating means and said unitary valve stem upper end portion, said bearing assembly rotatably supporting said bellows cap in said actuating means, and said bellows upper end portion being sealingly connected to said bellows cap to form the upper portion of said primary pressure boundary between said bellows and said valve stem around said valve stem upper end portion.

5. A valve comprising, a valve body, a passageway extending through said valve body for the flow of fluid therethrough, a valve member positioned in said passageway for rotatable movement about a first axis between an open position and a closed position to open and close said passageway, actuating means rotatable in an orbital path about said first axis for moving said valve member between an open position and a closed position, a unitary valve stem extending between said valve member and said actuating means, said unitary valve stem having a lower end portion aligned with said first axis and connected to said valve member for rotation with said valve member about said first axis, said unitary valve stem having an upper end portion aligned with a second axis and connected to said actuating means, a bearing assembly retained in said actuating means for supporting said unitary valve stem upper end portion, an internally pressurized bellows surrounding said unitary valve stem, said bellows having a lower end portion and an upper end portion, said actuating means includes a handle for applying torque to rotate said unitary valve stem and said valve member, said handle being rotatably connected said unitary valve stem upper end portion to permit the transmission of torque from said handle to said valve stem without applying tension to the bellows, said handle being displaced laterally of said first axis so that the force applied to said handle is transmitted through said bearing assembly to said valve stem upper end portion to rotate said valve stem about said first axis as said handle is turned in an orbital path about said first axis, said handle having a recess for axially receiving said bearing assembly, said bearing assembly including a bearing member positioned in said handle recess, a bellows cap received within said bearing member, said bearing member being rotatable relative to said bellows cap, said bellows cap having an axial recess, a valve stem bearing surrounding said valve stem upper end portion, said valve stem bearing positioned in said bellows cap recess to permit rotation of said valve stem upper end portion relative to said bellows cap, and said bellows upper end portion being welded to said bellows cap whereby said handle and said stem upper end portion are rotatable relative to said bellows cap and said bellows upper end portion without transmitting torque to said bellows as said handle is orbited about said first axis to apply torque to said valve stem lower end portion.

6. A valve comprising, a valve body, a passageway extending through said valve body for the flow of fluid therethrough, a valve member positioned in said passageway for rotatable movement about a first axis between an open position and a closed position to open and close said passageway, actuating means rotatable in an orbital path about said first axis for moving said valve member between an open position and a closed position, a unitary valve stem extending between said valve member and said actuating means, said unitary valve stem having a lower end portion aligned with said first axis and connected to said valve member for rotation with said valve member about said first axis, said unitary valve stem having an upper end portion aligned with a second axis and connected to said actuating means, a bearing assembly retained in said actuating means for supporting said unitary valve stem upper end portion, an internally pressurized bellows surrounding said unitary valve stem, said bellows having a lower end portion and an upper end portion, said bearing assembly including bellows cap surrounding said unitary valve stem upper end portion, a first bearing member retained in said bellows cap in surrounding relation with said unitary valve stem upper end portion for rotatably supporting said valve stem upper end portion, a second bearing member retained in said actuating means in surrounding relation with said bellows cap for rotatably supporting said bellows cap in said actuating means to permit transmission of force from said actuating means to said valve stem upper end portion to rotate said valve stem about said first axis without transmitting torque to said bellows upper end portion, a housing surrounding said bellows to form a secondary pressure boundary between said actuating means and said valve body, said housing non-rotatably connected to said actuating means in surrounding relation with said bellows cap, and said housing rotatably connected to said valve body to rotate with said valve stem about said first axis.

7. A valve as set forth in claim 6 in which, said bellows upper end portion being sealingly connected to said bellows cap to form a primary pressure boundary around said valve stem upper end portion, and said bellows upper end portion being rotatable with said bellows cap relative to said actuating means.

8. A valve as set forth in claim 6 which includes,
said bellows cap connected to said bellows upper end portion and surrounding said unitary valve stem upper end portion, and
said second member being positioned between said bellows cap and said actuating means to permit rotation of said actuating means and said valve stem relative to said bellows upper end portion and said bellows cap as force is applied to said actuating means to open and close said valve.
9. A valve as set forth in claim 6 in which,
said handle includes a recessed end portion, and
said unitary valve stem upper end portion being sealingly positioned in said recessed end portion to form a seal around said valve stem upper end portion within said handle.
10. A valve as set forth in claim 6 in which,
said first axis is positioned perpendicular to said second axis.
11. A valve as set forth in claim 6 in which,
said first axis is positioned in a vertical plane and said second axis is positioned at an angle relative to said first axis.

* * * * *